United States Patent [19]

Greene et al.

[11] 3,842,274

[45] Oct. 15, 1974

[54] PHOTOCONDUCTIVELY ACTIVATED GATED, INFRARED CHARGE COUPLED IMAGING DEVICE (PAGIRCCD)

[75] Inventors: Richard F. Greene, Bethesda; Richard B. Schoolar, Silver Spring; K. Peter Scharnhorst, Beltsville, all of Md.

[73] Assignee: The United States of America as represented by the Secretary of the Navy, Washington, D.C.

[22] Filed: Nov. 15, 1973

[21] Appl. No.: 416,300

[52] U.S. Cl. .................. 250/330, 250/338, 250/370

[51] Int. Cl. .................. G01j 5/00

[58] Field of Search .......... 250/330, 332, 338, 370, 250/371

[56] References Cited

UNITED STATES PATENTS

| | | | |
|---|---|---|---|
| 3,665,190 | 5/1972 | Kotera et al. | 250/370 X |
| 3,727,057 | 4/1973 | Higby et al. | 250/338 |
| 3,731,119 | 5/1973 | Matzen | 250/370 X |

*Primary Examiner*—Archie R. Borchelt

*Attorney, Agent, or Firm*—R. S. Sciascia; J. A. Cooke

[57] ABSTRACT

A radiation detector which operates in the infrared 1 to 14 micron region of the electromagnetic spectrum. The detector consists of an infrared charge coupled device which depends on capacitive coupling across the interface of silicon of the photoconductive response of a narrow gap semiconductor so as to dispense with carrier injection across that interface.

4 Claims, 3 Drawing Figures

PHOTOCONDUCTIVELY ACTIVATED GATED, INFRARED CHARGE COUPLED IMAGING DEVICE (PAGIRCCD)

BACKGROUND OF THE INVENTION

Infrared detectors have been built or proposed to operate on a number of different physical phenomena, such as photoconductivity in narrow gap or impurity semiconductors, photovoltaic effects at pn junctions in narrow gap semiconductors, or at Schottky and other surface barriers, bolometric effects, absorption in superconducting Josephson junction, electron emission at photocathodes, and others. For a number of applications it is desirable to produce an image of the infrared source or scatterer. Infrared imaging devices may employ a single photosensitive element which then must be sequentially illuminated by different portions of the image, using a mechanical scanner or other scanning devices. Other kinds of imaging devices employ two dimensional arrays of photosensitive elements, each of which receives and detects the infrared intensity of a definite segment of the image. Similarly, some devices employ a continuous large area of usually amorphous detector which may be scanned, e.g. by an electron beam. Furthermore there are intermediate schemes utilizing an intermediate, often one dimensional, array of detectors, each of which then has a particular set of image segments focussed sequentially upon it. However, the one dimensional arrays are not able to integrate a weak incident flux density over a fairly long time and thus lack a high potential sensitivity obtainable by the two dimensional arrays. On the other hand, the single or few element array detector may have the advantage of simple fabrication and low cost, a simpler method of rejecting background radiation. The single element detector also avoids the difficulties of making each element of a mosaic have equal sensitivity or response.

Recently, silicon technology charge coupled devices (CCD), using two-dimensional arrays of shift registers, have been used successfully as image devices in the visible spectrum. They offer several important advantages over competitive visible imagers: (*a*) use of standard silicon integrated circuit technology; (*b*) direct video signal output; (*c*) self scanning and other signal processing capabilities; (*d*) extreme compactness; (*e*) high reliability; (*f*) compatibility with silicon based system electronics.

For the above-mentioned reasons it would be highly desirable to adapt the silicon CCD technology to infrared rather than visible imaging. This cannot be done in silicon itself because the silicon absorption edge occurs at too short a wave length. Various schemes for bypassing this difficulty have been proposed. One such scheme is to fabricate the CCD in a narrow gap semiconductor, such as GeTe, PbS, PbTe, InSb, PbSnTe, PbSnSe, HgCdTe, etc., which would provide electron-hole generation in the infrared spectral region. The difficulties with such a scheme is that neither sufficiently low carrier recombination rates for storage in a CCD "bucket" nor sufficiently good uniformity of "buckets" have been achieved in semiconductors other than silicon. Another such scheme is to use an epitaxial heterojunction layer of small gap semiconductor grown on, e.g. the back of a thin silicon chip which has a two-dimensional CCD array on the front. The basic idea of such a device is that infrared radiation is absorbed in the small gap semiconductor, producing electron-hole pairs, one kinds of which is injected across the hetrojunction into the silicon and then swept or diffused across the silicon chip into the CCD register. This kind of device suffers from several difficulties related to the injection process: (*a*) one has to grow device quality epitaxial layers; (*b*) the interface recombination center density must be low and uniform and; (*c*) the relative work function must be such as to favor injection of the desired carrier. For all these reasons we propose to develop an infrared CCD image device based on somewhat different operating principles.

SUMMARY OF THE INVENTION

The present device overcomes the disadvantages and limitations of the prior art by providing an infrared charge coupled image device. The device consists of an array of charge coupled elements controlled by capacitive coupling through the oxide layer of the semiconductor substrate by a photoconductive resistor. The photoconductive resistor changes the voltage on the gate of the charge coupled element upon detection of infrared light to open a channel for minority carriers to flow from the source to the drain of the charge coupled element. The drains of the array are subsequently connected to form a shift register so that the image information may be retrieved.

It is therefore an object of the present invention to provide a new and improved infrared image device.

It is also an object of the present invention to provide an infrared image device which has a high potential sensitivity.

Another object of the present invention is to provide an infrared image device which is simple and easy to fabricate.

Another object of the present invention is to provide an infrared image device which is inexpensive to construct.

Another object of the invention is to provide an infrared image device which can easily reject background radiation.

Another object of the invention is to provide an infrared image array which can be simply constructed so that each element of the array has virtually the same sensitivity.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
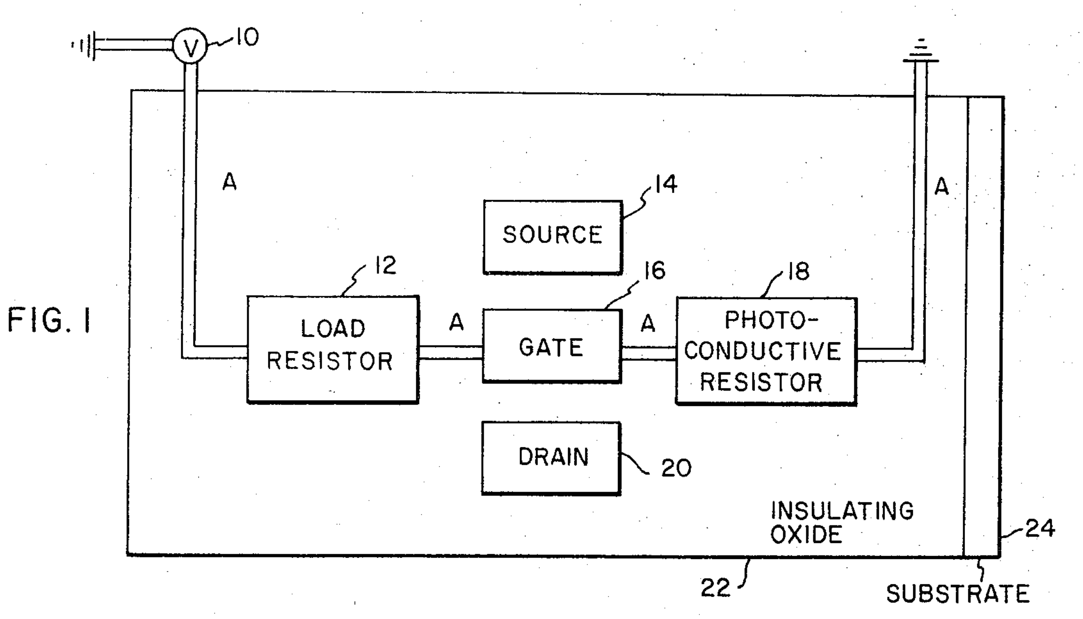
FIG. 1 is a top view of a single element of the infrared image array comprising the preferred embodiment.

FIG. 1 is a diagram of the infrared charge coupled device comprising the present invention. Voltage source 10 applies a a voltage to the photoconductive circuit comprising load resistor 12 and photoconductive resistor 18. The photoconductive circuit is connected to a conventional charge coupled device comprising source 14, gate 16, and drain 20.

The photoconductive resistor 18 is constructed of a polycrystalline or amorphous narrow gap photoconductive semiconductor such as GeTe, PbS, PbTe, InSb, HgCdTe, or any other material sensitive to infrared radiation, having a wavelength greater than 1.1$\mu$. When infrared light of this range of wavelengths is applied to the photoconductive resistor 18, the voltage developed at the gate 16 of the charge coupled device varies proportionally with the intensity of the incident light. This voltage developed at the gate 16 is applied to the insulating oxide 22 such that there is a charge flow from the source bucket to the charge storage bucket at the drain 20. This phenomenon is more clearly shown in FIG. 2.

Figure 2:
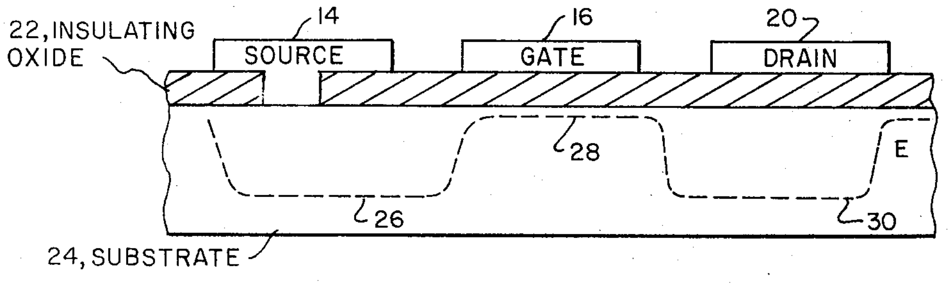
FIG. 2 is a side view of a single element of the infrared array shown in conjunction with an energy graph.

FIG. 2 is a side view of the charge coupled device with a superimposed energy graph plotted thereon.

An electrical signal is applied to the source 14 so as to fill the source energy bucket 26 with minority carriers. In this case the substrate is a P-type material so that the minority carriers are electrons which have a very quick reaction time. A similar signal is applied to the drain 20 to create an empty drain bucket 30. By controlling the energy level 28 of the substrate at the gate 16, the amount of carriers transferred from the source energy bucket 26 to the drain storage bucket 30 can be controlled. Since the voltage at gate 16 is proportioned to the resistance of photoconductive resistor 18, the amount of carriers stored in the drain storage bucket 30 is therefore indicative of the intensity of light applied to the photoconductive resistor 18. In other words, the gate 16 provides an integrated signal charge in the drain storage bucket 30 corresponding to the incident infrared radiation time product.

Figure 3:
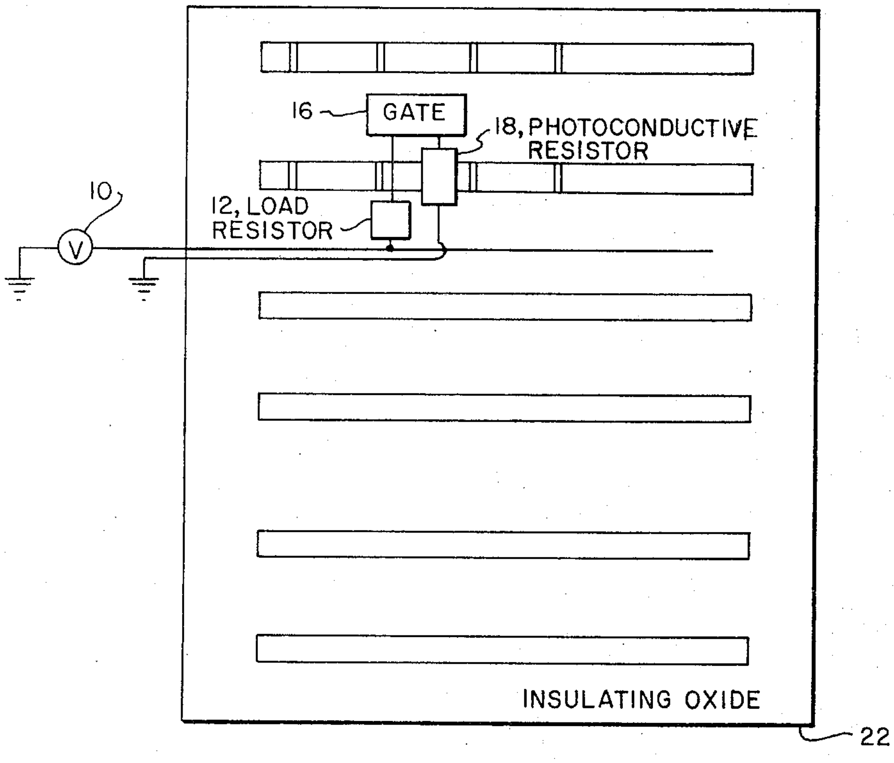
FIG. 3 is a top view of the infrared image array comprising the preferred embodiment.

The circuits of FIG. 1 are grown directly on the oxide coated silicon substrate by a process of vacuum evaporation. Each of these circuits can be duplicated a number of times in a very small area as shown in FIG. 3 to form a two dimensional array. By selectively connecting each of the drains 20, the detected image data can be sifted in a manner similar to a shift register for transmission to a cathode ray tube for projection. The result of this operation is that the silicon charge coupled register array as shown in FIG. 3 records an infrared image. Both the silicon CCD structure and the photoconductive semiconductor can be designed for operation from room temperature down to temperature for liquid nitrogen.

The principal advantage of the proposed infrared charge storage device is that it is based on capacitive coupling between a silicon CCD register array and an infrared sensitive semiconductor, rather than coupling by charge injection. The proposed new device therefore dispenses with the need for epitaxial growth, low and controlled interface recombination center density as a heterojunction interface.

Another advantage of the device is that standard integrated circuit silicon technology can be used to fabricate the CCD in a silicon chip, with high uniformity. Also, the voltage in the external voltage divider circuit can be adjusted so that the integrating gates are biassed just to cutoff under the ambient background radiation, so that device saturation by the background is avoided.

In addition, the technology of producing uniform and reliable amorphous and polycrystalline semiconductor films is fairly well developed, thereby rendering good results at low costs.

Similarly, standard post-fabrication laser trimming of the voltage divider resistance $R_2$ can be employed to achieve economic equalization of the photoresponse of each element.

Another advantage of the device is its low mass and low power requirements, which make it convenient and economical for cooled operation, e.g., by thermoelectric cooling applied directly to the back face of the silicon chip. Also, the use of a second interleaved CCD resistor array to provide a gated source charge results in low cross-talk between neighboring imaging elements.

Another advantage of the device is the very high resolution and acuity achievable due to the relatively high density of image elements. Of course, since IR CCD image device permits various signal processing functions to be performed in the image chip itself, the result is low noise and compact function, with the possibility of minimizing unnecessary information traffic from the imager to some other system element utilizing the infrared information.

Obviously many modifications and variations of the present invention are possible in light of the above teachings.

For example, any number of different geometrical configurations of both the area and the thickness of the voltage divider photoconductive semiconductor overlay, as well as different configurations of the electrodes, and different methods of providing the source charge may prove advantageous in the process of optimizing the performance of a device. In particular, multiple configurations of two or more photoconductive resistors, sensitive to different infrared wavelengths may be used. The purpose of this would be to use the relative intensity at different wavelengths to distinguish between thermal and non-thermal infrared sources or scatterers.

Additionally, a large class of amorphous and polycrystalline semiconductors may be used, such as InSb or other III-V semiconductors or alloy, GeTe or PbS or IV-VI semiconductors or alloy, HgCdTe or HgMnTe may be used, etc., the criterion being an appropriate infrared spectral sensitivity and suitability for the device fabrication techniques. Also, sputtering techniques, chemical deposition pyroltic deposition, etc., may be used instead of vacuum evaporation.

It is therefore to be understood that within the scope of the appended claims the invention may be practiced otherwise than as specifically described.

We claim:

1. An infrared charge coupled image device for detecting infrared images comprising:

means for providing a source of minority carriers in a substrate;

means for providing a drain for said minority carriers;

gating means disposed between said source providing means and said drain providing means for regulating the flow of said minority carriers from said source providing means to said drain providing means; and, photoresponsive control means connected to said gating means for controlling the regulating function of said gating means.

2. The device of claim 1 wherein said photoresponsive means is responsive to radiation having wavelengths greater than 1.1 $\mu$.

3. The device of claim 1 wherein said photoresponsive means comprises:

a voltage source;

a load resistor connected to said voltage source and said gating means;

a photoconductive resistor connected to said gating means and a ground potential.

4. The device of claim 2 wherein said photoresponsive means comprises:

a voltage source;

a load resistor connected to said voltage source and said gating means;

a photoconductive resistor connected to said gating means and a ground potential.

5. The device of claim 3 wherein said photoconductive resistor is constructed of a polycrystalline narrow gap photoconductive semiconductor of GeTe.

6. The device of claim 3 wherein said photoconductive resistor is constructed of a polycrystalline narrow gap photoconductive semiconductor of PbS.

7. The device of claim 3 wherein said photoconductive resistor is constructed of a polycrystalline narrow gap photoconductive semiconductor of PbTe.

8. The device of claim 3 wherein said photoconductive resistor is constructed of a polycrystalline narrow gap photoconductive semiconductor of InSb.

9. The device of claim 3 wherein said photoconductive resistor is constructed of a polycrystalline narrow gap photoconductive semiconductor of HgCdTe.

* * * * *